United States Patent Office 3,308,149
Patented Mar. 7, 1967

3,308,149
ORGANIC POLYALKYLENEOXY SILICATES
Leslie M. Schenck, Mountainside, Leslie G. Nunn, Jr., Metuchen, and Robert E. Leary, Westfield, N.J., assignors to General Aniline & Film Corporation, New York, N.Y., a corporation of Delaware
No Drawing. Filed June 13, 1963, Ser. No. 287,510
6 Claims. (Cl. 260—448.8)

This invention relates to a new and useful class of organic polyalkyleneoxy silicates having many valuable industrial applications.

We have found that a novel class of organic polyalkylene oxy silicates are synthesized by the ester inter-change between an alkyl- or aryl-polyalkyleneoxy alkanol and a tetra substituted silicate at a temperature of from 170° to 250° C. and a pressure of from 5 to 20 mm. for a period of time ranging 5 to 15 hours. More specifically, from 1 to 4 moles of either an alkyl- or aryl-polyalkyleneoxy alkanol is inter-reacted with 1 mole of a tetra substituted silicate within the said temperature, pressure and time range. During this ester inter-change from 1 to 4 moles of an alkyl- or aryl-monohydroxy compound resulting from the tetra substituted silicate is released and removed from the reaction product by vaporization. Depending upon the character of the tetra substituted silicate, the monohydroxy alkyl or monohydroxy aryl compound released is a volatile alcohol or phenol, respectively. The products obtained range from viscous oils to waxy solids, which are particularly adaptable as functional fluids such as, for example, hydraulic fluids, synthetic lubricants, etc., in water-repellent formulations, in cosmetics, and as mold-release agents.

The alkyl- and aryl-polyalkyleneoxy silicates prepared in accordance with the present invention are characterized by the following formulae:

(1) 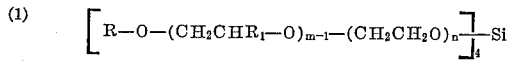

(2) 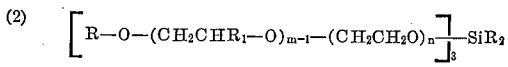

(3) 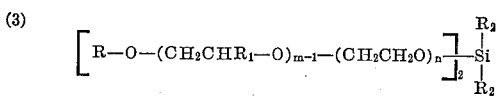

(4) 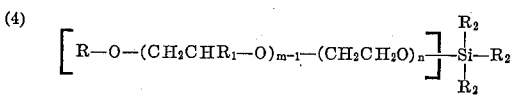

wherein R represents either a straight or branched chain alkyl radical containing from 10 to 28 carbon atoms, e.g., decyl, hendecyl, dinonyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, myricyl, etc., or an aryl radical of 6 to 14 carbon atoms, e.g., phenyl, diphenyl, naphthyl, 2- and 5-anthryl, etc, which are unsubstituted or substituted by a mono-, di- or tri-alkyl of from 1 to 18 carbon atoms, e.g., dimethylphenyl, dipropylphenyl, nonylphenyl, dinonylphenyl, octadecylphenyl, tri-octadecylphenyl, etc., $R_1$ represents either hydrogen, methyl or ethyl group, the $R_2$'s, which may be the same or different represent either alkoxy, e.g. methoxy, ethoxy, propoxy, butoxy, hexyloxy, nonyloxy, decyloxy, dodecyloxy, docosyloxy, tricosyloxy, hexacosyloxy, octadecyloxy, heptasyloxy, or an aryloxy radical of 6 to 14 carbon atoms, e.g. phenyloxy, diphenyloxy, naphthyloxy, anthryloxy, etc. The said alkoxy and aryloxy groups may be either unsubstituted or substituted by a halogen, a straight or branched chain alkyl of from 1 to 22 carbon atoms, or by polyethyleneoxy chain containing from 5 to 35 units of ethylene oxide, m represents a positive integer of from 1 to 150 and n represents a positive integer of from 1 to 150.

The polyalkyleneoxy alkanols from straight or branched chain alkyl alcohols of 10 to 28 carbon atoms and the polyalkylene aryl alcohols and the various alkylates characterized by the formula $$R-O-(CH_2CHR_1-O)_m-H$$

wherein R and $R_1$ have the same values as above and m has a value of from 1 to 150, prior to silicate formation, are prepared by the usual methods of the prior art. Suitable methods for their preparation are described in United States Patents 1,970,578; 2,213,477; 2,575,832; 2,593,112 and 2,676,975, the complete disclosures and teachings of which are incorporated herein by reference thereto.

The tetrasubstituted silicates, which are well known compounds, are characterized by the general formula:

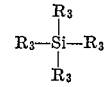

wherein the $R_3$'s have the same value as the $R_2$'s above and are exemplified by the following:

Tetramethyl silicate
Tetraethyl silicate
Tetrapropyl silicate
Tetrabutyl silicate
Tetrahexyl silicate
Tetraoctyl silicate
Tetradecyl silicate
Tetradodecyl silicate
Tetratridecyl silicate
Tetrapentadecyl silicate
Tetraoctadecyl silicate
Tetraphenyl silicate
Tetra-p-chloro-silicate
Tetra-p-cresyl-silicate
Tetra[-p-2-hexylphenyl]silicate
Tetranaphthyl silicate The following illustrative examples will show how the alkyl- and aryl-polyalkyleneoxy silicates are prepared and how they may be employed in various commercial applications. All parts given are by weight unless otherwise noted.

*Example I*

Into a 1-liter flask equipped for vacuum distillation there was added a mixture consisting of 133.3 grams of tetraphenyl silicate (0.33 mol) and 286 grams (1 mol) of a commercial nonylphenol ethoxylate containing an average mole ratio of 1.5 units of ethylene oxide per unit of nonylphenol and the mixture gradually heated from ambient temperature to 250° C. over five hours under reduced pressure of 15 mm. A total of 31 grams phenol was collected as distillate. The residual viscous yellow oil contained 2.93% Si compared to the theoretical of 2.87% Si.

The product, i.e., the viscous yellow oil has the following structure:

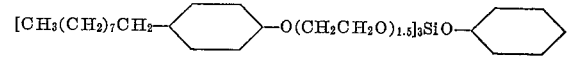

and had the following properties:

$N_D{}^{25}=1.5160$   $d_4{}^{25}$ 1.027  viscosity 46.6 centistokes

*Example II*

Into a 1-liter flask equipped for vacuum distillation there was added a mixture consisting of 389 grams of a six mole ethylene oxide adduct of commercial nonylphenol (0.8 mole) and 90 grams (0.2 mole) of tetraphenyl silicate and the mixture rapidly heated to 170° at 10 mm. pressure. The temperature was slowly increased to 230° C. over six hours, distilling off 73 grams of phenol. The residue with the following structure:

contained 1.49% silicon by analysis, and has the following properties:

$N_D^{25}$ 1.4989 $d_4^{25}$ 1.055 viscosity 42.8 centistokes

*Example III*

Example I was repeated with the exception that the 1-liter flask was replaced by a 5-liter flask and 286 grams of the commercial nonylphenol ethoxylate were replaced by 1791 grams (.33 mol) of phenol ethoxylated with 120 moles of ethylene oxide. The product, a low melting waxy solid, has the following structure:

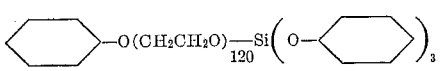

and contained 0.6% silica by analysis.

*Example IV*

Example II was repeated with the exception that the 1-liter flask was replaced by a 2-liter flask and the 389 grams of the 6 mole ethylene oxide adduct of commercial nonylphenol was substituted by 503 grams (0.8 mole) of Oxo-tridecylalcohol ethoxylated to 9.75 average mole ratio of ethylene oxide. The residual pale yellow oil, 494 grams, analyzed for 1.18% silicon and has the following structure:

$$[CH_3(CH_2)_{11}CH_2O(CH_2CH_2O)_{9.75}]_4Si$$

The compound has the following physical constants:

$N_D^{25}$ 1.4625 $d_4^{25}$ 1.030 viscosity 15.1 centistokes

*Example V*

Example I was repeated with the exception that the 1-liter flask was replaced by a 2-liter flask and the 286 grams of a commercial nonylphenol ethoxylate containing an average mole ratio of 1.5 units of ethyleneoxy per unit of nonylphenol were replaced by 665 grams (0.66 mole) of a 15 mole ethoxylate of commercial dinonylphenol. The product has the following structure:

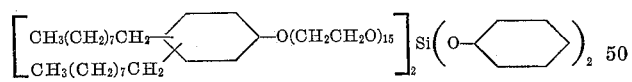

and has a silicon content of 1.25% by weight.

*Example VI*

Example I was repeated with the exception that the 1-liter flask was replaced by a 5-liter flask and 2282 grams (0.33 mole) of the 150 mole ratio ethylene oxide adduct of 2,4,6-tri-tertiary butylphenol were substituted for 286 grams of a commercial nonylphenol ethoxylate containing an average mole ratio of 1.5 units of ethylene oxide per unit of nonylphenol. By analysis, 0.4% silicon was found in the product of the following structure:

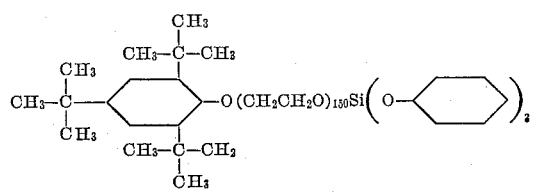

*Example VII*

Example I was repeated with the exception that 69.3 grams (0.33 mole) tetraethylsilicate were substituted for 133.3 grams tetraphenylsilicate. The product has the following structure:

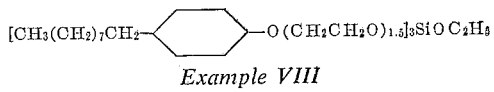

*Example VIII*

Example I was repeated with the exception that 368 grams (0.33 mole) tetraoctadecylsilicate were substituted for 133.3 grams tetraphenylsilicate. The product has the following structure:

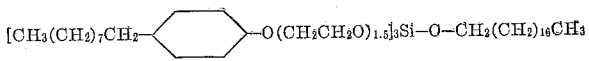

*Example IX*

Example I was repeated with the exception that 174 grams (0.33 mole) tetra-p-chlorophenylsilicate were substituted for 133.3 grams tetraphenylsilicate. The product has the following structure:

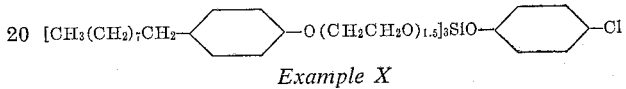

*Example X*

Example I was repeated with the exception that 152.0 grams (0.33 mole) tetra-p-cresylsilicate was substituted for 133.3 grams tetraphenylsilicate. The product has the following structure:

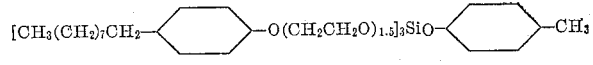

*Example XI*

Example I was repeated with the exception that 246.0 grams (0.33 mole) tetra [p-2-hexylphenyl] silicate were substituted for 133.3 grams tetraphenylsilicate. The product has the following structure:

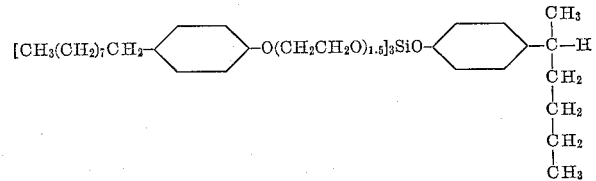

*Example XII*

Forty grams (0.1 mole) of tetraphenylsilicate were reacted as in Example I with 313.6 grams (0.4 mole) tridecyl alcohol alkoxylated with 8 moles of ethylene oxide and 4 moles of propylene oxide. The resultant product has the following structure:

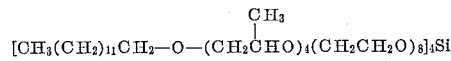

*Example XIII*

Forty grams (0.1 mole) of tetraphenylsilicate were reacted as in Example I with 344.0 grams (0.4 mole) nonylphenol alkoxylated with 8 moles of ethylene oxide and 4 moles butylene oxide to give a product of the following structural formula:

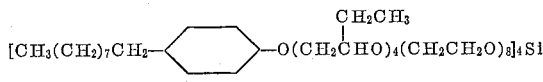

*Example XIV*

566 grams (0.1 mole) of the product of Example II were reacted in a 2-liter flask equipped for vacuum distillation with 77 grams (0.1 mole) of the 10 mole ethylene oxide adduct of docosanol ($CH_3(CH_2)_{20}CH_2OH$) by heating at 170° C. to 230° C. at 10 mm. pressure until 9.4 grams (0.1 mole) phenol was removed to obtain a reaction product having the following structure:

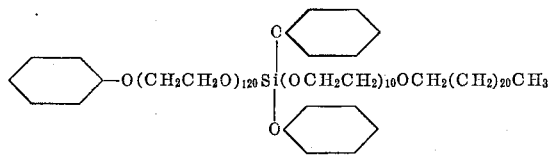

Equimolar quantities of the foregoing product and a 5 mole ethylene oxide adduct of methanol were then reacted under the same conditions to obtain a reaction product having the following structure:

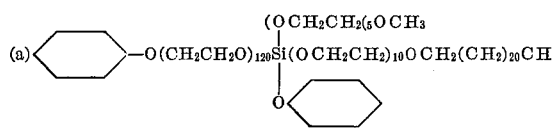

Equimolar quantities of the above product, (a), and a 20 mole ethylene oxide adduct of tri-octadecyl phenol were reacted under the same conditions to obtain a reaction product having the following structure:

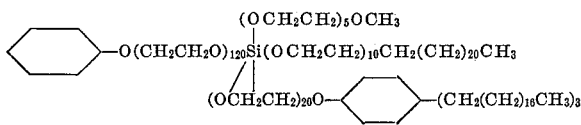

In connection with Example XIV, it is to be noted that instead of employing from 5 to 35 moles of ethylene oxide, a variety of new and useful products can be prepared by replacing the ethylene oxide by either propylene oxide, butylene oxide or mixtures thereof.

Since all of the foregoing silicates incorporated both the desirable features of polyoxyalkylene ethers and orthosilicates they have many useful properties. For example, they may be used in the formulation of functional fluids, paints, plastics, greases, lubricants and other petroleum products, catalysts, drugs, textile auxiliaries, and the like. In the formulation of functional fluids they may be used to modify lubricating, viscosity and other rheological properties. They may be used in hydraulic and refrigeration systems. Their mild nature makes them of value in applications such as cosmetics, detergents, polishes, fabric cleaners and other cleaning products for household and industrial uses. They also are applicable in non-aqueous media such as solvent base paints and other protective coatings and the like. They may also be used in textile processing such as in fiber finishes, water repellants, antistatic agents, weighting textile goods, kier boiling, scouring, and other textile applications. These esters may also be used to improve strength in cotton goods. They may also be used to modify the surface properties of leather, wood, paper and other related materials. Another use is as modifiers in protective coatings, such as paints and enamels. Still another use is in the preparation of catalyst carriers. They may also be used in the manufacture of polymers as intermediates such as crosslinking agents and to improve scratch resistance. They are also useful in biocidal formulations as emulsifiers, in industrial applications such as defoamers, corrosion inhibitors, refractory binders in investment casting, gelling agents, additives to improve adhesion of protective coatings such as lacquers and resins to glass.

We claim:

1. An organic polyalkyleneoxy silicate selected from the class consisting of those characterized by the following formulae:

(1) 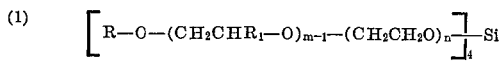

(2) 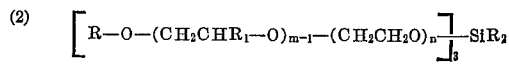

(3) 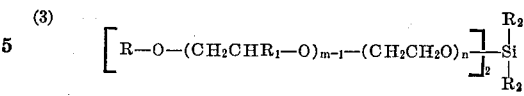

and (4) 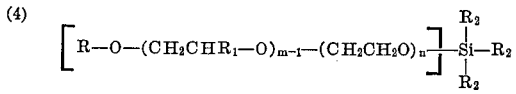

wherein R represents a member selected from the class consisting of alkyl of from 10 to 28 carbon atoms and aryl of from 6 to 14 carbon atoms, said aryl containing as a substituent a member selected from the class consisting of hydrogen, mono-, di- and tri-alkyl groups of from 1 to 18 carbon atoms, $R_1$ represents a member selected from the class consisting of hydrogen, methyl and ethyl, the $R_2$'s represent members independently selected from the class consisting of alkoxy of from 1 to 27 carbon atoms and aryloxy of from 6 to 14 carbon atoms, said alkoxy and aryloxy containing as a substituent a member selected from the class consisting of hydrogen, halogen, alkyl of from 1 to 22 carbon atoms and polyethyleneoxy chain having from 5 to 35 units of ethylene oxide, and $m$ and $n$ represent a positive integer of from 1 to 150.

2. The organic polyalkyleneoxy silicate having the following formula:

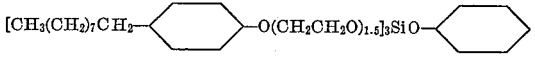

3. The organic polyalkyleneoxy silicate having the following formula:

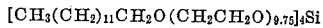

4. The organic polyalkyleneoxy silicate having the following formula:

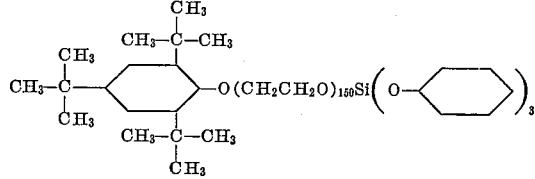

5. The organic polyalkyleneoxy silicate having the following formula:

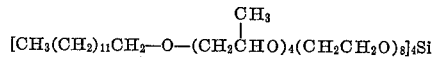

6. The organic polyalkyleneoxy silicate having the following formula:

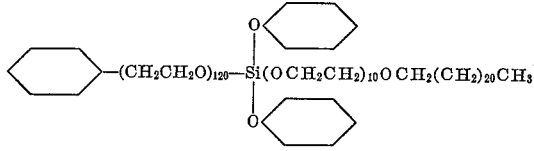

References Cited by the Examiner

UNITED STATES PATENTS 2,717,242   9/1955   Foehr _____ 260—448.8
2,839,558   6/1958   Kirkpatrick et al. __ 260—448.8

OTHER REFERENCES

Abrahamson et al.: "Jour. Organic Chem.," vol. 13, March 1948, p. 275–279.

TOBIAS E. LEVOW, *Primary Examiner.*

SAMUEL H. BLECH, HELEN M. McCARTHY,
*Examiners.*

P. F. SHAVER, *Assistant Examiner.*